(12) United States Patent
Merker

(10) Patent No.: US 12,292,812 B2
(45) Date of Patent: May 6, 2025

(54) TELEMETRY FOR QUERY PROCESSING MEMORY USAGE

(71) Applicant: SAP SE, Walldorf (DE)

(72) Inventor: Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 629 days.

(21) Appl. No.: 17/687,262

(22) Filed: Mar. 4, 2022

(65) Prior Publication Data

US 2023/0281195 A1 Sep. 7, 2023

(51) Int. Cl.
*G06F 11/34* (2006.01)
*G06F 9/50* (2006.01)

(52) U.S. Cl.
CPC ........ *G06F 11/3442* (2013.01); *G06F 9/5016* (2013.01); *G06F 2209/508* (2013.01)

(58) Field of Classification Search
CPC ............... G06F 11/3442; G06F 9/5016; G06F 2209/508
See application file for complete search history.

(56) References Cited

U.S. PATENT DOCUMENTS

| | | | | |
|---|---|---|---|---|
| 6,658,653 B1 * | 12/2003 | Bates | ................... | G06F 11/366 |
| | | | | 717/125 |
| 10,733,090 B1 * | 8/2020 | Larsson | ............... | G06F 12/0284 |
| 12,045,155 B1 * | 7/2024 | Ouyang | ................ | G06F 9/5016 |
| 2003/0056200 A1 * | 3/2003 | Li | .......................... | G06F 11/323 |
| | | | | 714/E11.181 |
| 2005/0235054 A1 * | 10/2005 | Kadashevich | ...... | G06F 11/3466 |
| | | | | 714/E11.2 |
| 2007/0260608 A1 * | 11/2007 | Hertzberg | ............. | G06F 12/023 |
| 2014/0282583 A1 * | 9/2014 | Dawson | ................ | G06F 9/5016 |
| | | | | 718/104 |
| 2018/0246911 A1 * | 8/2018 | Lee | ........................ | G06F 16/21 |
| 2019/0250948 A1 * | 8/2019 | Dungarwal | ............... | G06F 9/50 |
| 2020/0097392 A1 * | 3/2020 | Pizlo | .................. | G06F 12/0284 |
| 2021/0109974 A1 * | 4/2021 | Shekhar | ................ | G06F 3/0631 |
| 2022/0283864 A1 * | 9/2022 | Kwon | .................. | G06F 9/5016 |
| 2023/0216866 A1 * | 7/2023 | Monnig | ............. | H04L 63/1425 |
| 2023/0281195 A1 * | 9/2023 | Merker | .............. | G06F 11/3409 |
| | | | | 707/769 |

\* cited by examiner

*Primary Examiner* — Benjamin C Wu
(74) *Attorney, Agent, or Firm* — Mintz Levin Cohn Ferris Glovsky and Popeo, P.C.

(57) ABSTRACT

A method may include receiving, from a first thread of a first operator performing a first operation of a query, a first request for memory allocation or memory deallocation. In response to the first request, a first local data structure of the first thread may be accessed to identify the first operator associated with the first request. A first memory usage metric for the first thread of the first operator may be updated based on the first request. A third memory usage metric for the first operator may be determined based on the first memory usage metric and a second memory usage metric for a second thread of the first operator. A fourth memory usage metric for a second operator may be determined based on a fifth memory usage metric for a third thread used by the second operator to perform a second operation of the query.

16 Claims, 5 Drawing Sheets

TELEMETRY FOR QUERY PROCESSING MEMORY USAGE

TECHNICAL FIELD

The subject matter described herein relates generally to database processing and more specifically to memory usage telemetry for query processing.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for memory usage telemetry for query processing. In some example embodiments, there is provided a system that includes at least one processor and at least one memory. The at least one memory may include program code that provides operations when executed by the at least one processor. The operations may include: receiving, from a first thread of a first operator performing a first operation associated with a query, a first request for memory allocation or memory deallocation; responding to the first request by at least accessing a first local data structure of the first thread to identify the first operator associated with the first request; updating, based at least on the first request, a first memory usage metric for the first thread of the first operator; and determining, based at least on the first memory usage metric for the first thread of the first operator and a second memory usage metric for a second thread of the first operator, a third memory usage metric for the first operator.

In some variations, one or more features disclosed herein including the following features can optionally be included in any feasible combination. The operations may further include: receiving, from the second thread of the first operator, a second request for memory allocation or memory deallocation; responding to the second request by at least accessing a second local data structure of the second thread to identify the first operator associated with the second request; and updating, based at least on the second request, the second memory usage metric for the second thread of the first operator.

In some variations, the operations may further include: receiving, from a third thread of a second operator performing a second operation associated with the query, a second request for memory allocation or memory deallocation; responding to the second request by at least accessing a second local data structure of the third thread to identify the second operator associated with the second request; updating, based at least on the second request, a fourth memory usage metric for the third thread of the second operator; and determining, based at least on the fourth memory usage metric for the third thread of the second operator, a fifth memory usage metric for the second operator.

In some variations, the first local data structure of the first thread may include a reference identifying the first operator to identify the first operator as being associated with the first request.

In some variations, the first memory usage metric includes a memory integral corresponding to a memory usage over time.

In some variations, the updating of the first memory usage metric may include updating a first value corresponding to a running aggregate of the memory integral, a second value corresponding to a size of a current memory allocation, and a third value corresponding to a timestamp of a last update to the running aggregate of the memory integral.

In some variations, the updating of the first memory usage metric may include adding, to the running aggregate of the memory integral, a result of multiplying the size of the current memory allocation by a difference between a current timestamp and the timestamp of the last update.

In some variations, the first memory usage metric may include one or more of peak memory usage, minimum size of memory allocation, maximum size of memory allocation, average size of memory allocation, and total quantity of memory allocations.

In some variations, the first local data structure may include a thread-local storage (TLS) of the first thread.

In some variations, the operations may further include responding to the first request by allocating or deallocating at least a portion of a memory allocated to the query.

In some variations, the first thread and/or the second thread may be executed in parallel with a third thread used by a second operator to perform a second operation associated with the query.

In another aspect, there is provided a method for memory usage telemetry for query processing. The method may include: receiving, from a first thread of a first operator performing a first operation associated with a query, a first request for memory allocation or memory deallocation; responding to the first request by at least accessing a first local data structure of the first thread to identify the first operator associated with the first request; updating, based at least on the first request, a first memory usage metric for the first thread of the first operator; and determining, based at least on the first memory usage metric for the first thread of the first operator and a second memory usage metric for a second thread of the first operator, a third memory usage metric for the first operator.

In some variations, one or more features disclosed herein including the following features can optionally be included in any feasible combination. The method may further include: receiving, from the second thread of the first operator, a second request for memory allocation or memory deallocation; responding to the second request by at least accessing a second local data structure of the second thread to identify the first operator associated with the second request; and updating, based at least on the second request, the second memory usage metric for the second thread of the first operator.

In some variations, the method may further include: receiving, from a third thread of a second operator performing a second operation associated with the query, a second request for memory allocation or memory deallocation; responding to the second request by at least accessing a second local data structure of the third thread to identify the second operator associated with the second request; updating, based at least on the second request, a fourth memory usage metric for the third thread of the second operator; and determining, based at least on the fourth memory usage metric for the third thread of the second operator, a fifth memory usage metric for the second operator.

In some variations, the first local data structure of the first thread may include a reference identifying the first operator to identify the first operator as being associated with the first request.

In some variations, the first memory usage metric includes a memory integral corresponding to a memory usage over time. The updating of the first memory usage metric may include adding, to a running aggregate of the memory integral, a result of multiplying a size of the current memory allocation by a difference between a current timestamp and a timestamp of a last update to the running aggregate of the memory integral.

In some variations, the first memory usage metric may include one or more of peak memory usage, minimum size of memory allocation, maximum size of memory allocation, average size of memory allocation, and total quantity of memory allocations.

In some variations, the first local data structure may include a thread-local storage (TLS) of the first thread.

In some variations, the method may further include responding to the first request by allocating or deallocating at least a portion of a memory allocated to the query.

In another aspect, there is provided a computer program product including a non-transitory computer readable medium storing instructions. The instructions may cause operations may executed by at least one data processor. The operations may include: receiving, from a first thread of a first operator performing a first operation associated with a query, a first request for memory allocation or memory deallocation; responding to the first request by at least accessing a first local data structure of the first thread to identify the first operator associated with the first request; updating, based at least on the first request, a first memory usage metric for the first thread of the first operator; and determining, based at least on the first memory usage metric for the first thread of the first operator and a second memory usage metric for a second thread of the first operator, a third memory usage metric for the first operator.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to memory usage telemetry for query processing, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
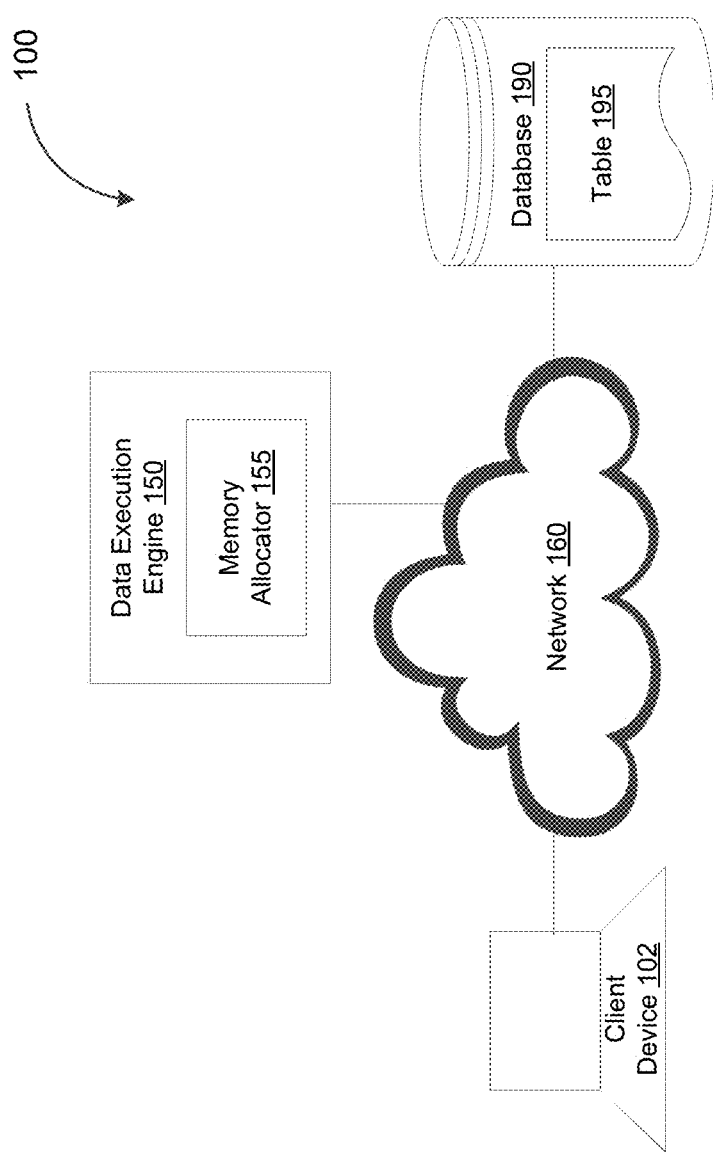
FIG. 1 depicts a system diagram illustrating an example of a database system, in accordance with some example embodiments.

An in-memory relational database may utilize main memory for the primary storage of database tables. In some cases, the in-memory relational database may be implemented as a column-oriented database (or a columnar database) that stores data from database tables by columns instead of by rows. As noted, each tuple of a relation may correspond to a record occupying one row of a database table while the columns of the database table may store the values of the common attributes shared by multiple tuples. Thus, in the columnar database, the values occupying each column of the database table, which may span multiple rows (or records) of the database table, may be stored sequentially in one or more data pages, with each data page storing at least a portion of a column. The in-memory column-oriented relational database may support efficient data compression and partitioning for massively parallel processing. Moreover, because the in-memory database is directly accessible by the central processing unit (CPU) of the computing engine, transactions accessing the in-memory database may be executed to provide near-instantaneous results.

The throughput and storage capacity of a database, such as an in-memory column—oriented relational database, may be maximized by distributing the processing and storage of data across multiple computing nodes. A single database table may therefore be divided into multiple partitions (or internal tables), for example, through one or more hash partitioning, round-robin partitioning, and range partitioning, and stored across multiple computing nodes. Doing so may maximize opportunities for parallelization in which a single query is divided into multiple operations, with operations accessing different partitions of the database table being scheduled for parallel execution. For example, one or more operators may be instantiated to perform the individual operations included in the execution plan for the query. A single operator assigned to perform an operation may use one or more threads to perform that operation. Accordingly, in such a parallelization framework, a single query may be executed in parallel by multiple operators using multiple threads.

The execution plan for a query may be analyzed, for example, based on one or more memory usage metrics associated with the execution plan. Examples of memory usage metrics include memory usage over time (e.g., the integral of memory usage known as "megabyte-seconds"), peak memory usage, minimum size of memory allocation, maximum size of memory allocation, average size of memory allocation, and total quantity of memory allocations. Although memory usage metrics are available for the query as a whole, tracking memory usage metrics for the individual operators within the execution plan of the query and for the call stack of each thread is infeasible within a conventional data execution engine that allocates memory without knowledge of the operators associated with each memory allocation. As such, in some example embodiments, a data execution engine may include a telemetry allocator with access to the local data structures of each thread (e.g., thread-local storage (TLS)) associated with a query. The local data structure of a thread may include a reference to the operator associated with the thread. Accordingly, when an active thread of an operator requests a memory allocation, the telemetry allocator may access the local data structure (e.g., thread-local storage (TLS)) of that thread to determine the operator. Meanwhile, the call stack associated with the memory allocation may be identified based on the return addresses stored in the call stack. Doing so may enable the telemetry allocator to attribute each memory allocation to the corresponding call stack and operator, thereby generating granular memory usage metrics for the individual operators and call stacks associated with the query.

FIG. 1 depicts a system diagram illustrating an example of a database system 100, in accordance with some example embodiments. Referring to FIG. 1, the database system 100 may include one or more client devices 102, a database execution engine 150, and one or more databases 190. As shown in FIG. 1, the one or more client devices 102, the database execution engine 150, and the one or more databases 190 may be communicative coupled via a network 160. The one or more databases 190 may include a variety of relational databases including, for example, an in-memory database, a column-based database, a row-based database, and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2:
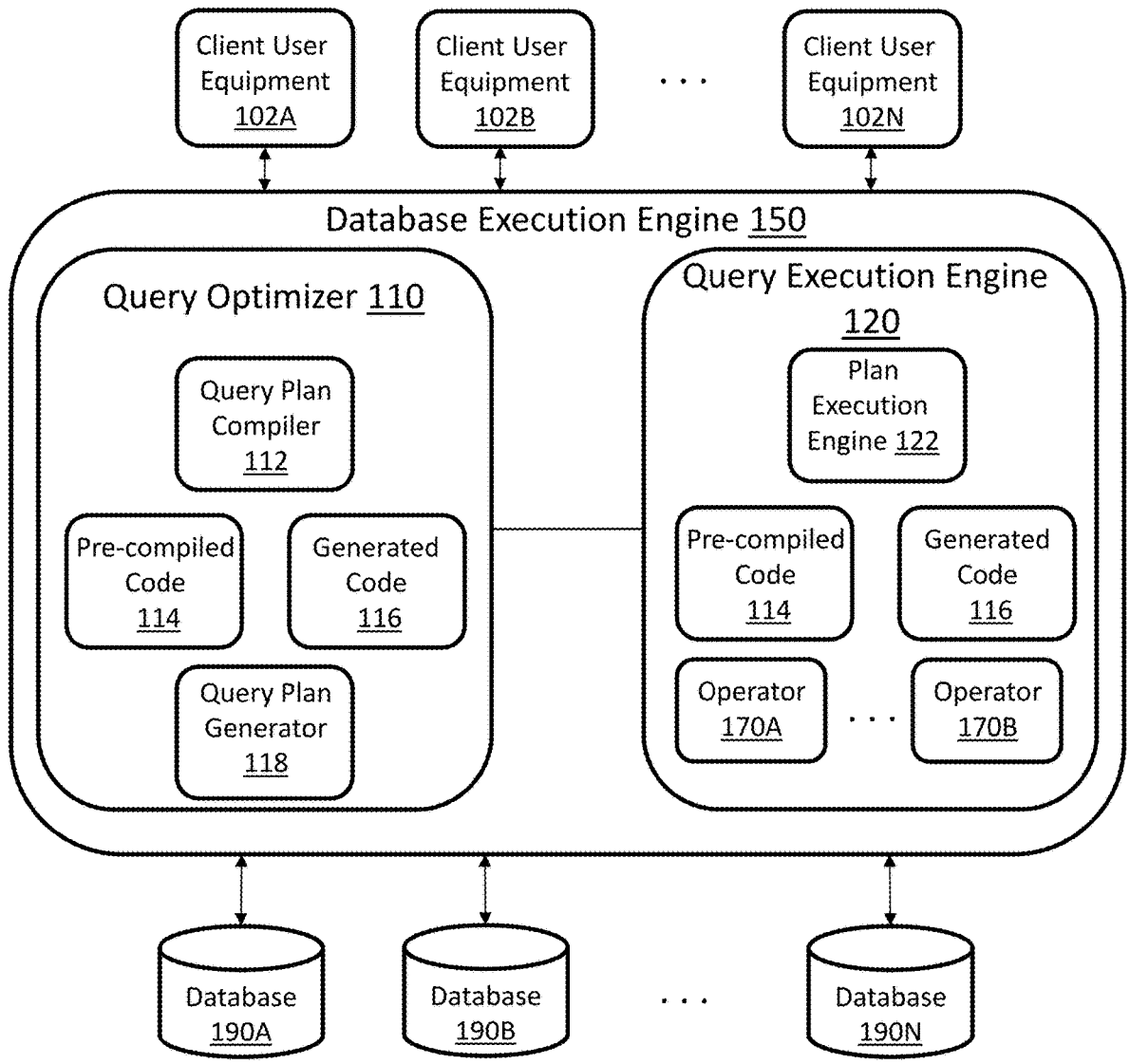
FIG. 2 depicts a block diagram illustrating an example of a database execution engine, in accordance with some example embodiments.

FIG. 2 depicts a block diagram illustrating an example of the data execution engine 150, in accordance with some example embodiments. As shown in FIG. 2, the one or more databases 190, which may include a first database 190A, a second database 190B, and a third database 190C, can represent the database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102, which may include the client devices 102A-N, may send a query via the data execution engine 150 to the database layer including the one or more databases 190, which may represent a persistence and/or storage layer where database tables may be stored and/or queried. The query may be sent via a connection, such as a wired connection and/or wireless connection (e.g., the Internet, cellular links, WiFi links, and/or the like) provided, for example, by the network 160.

Referring again to FIG. 2, the database execution engine 150 may include a query optimizer 110, such as a SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

In some example embodiments, the query optimizer 110 may optimize the query plan by compiling and generating code. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120.

The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of one or more database 190.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190 include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190. Moreover, the query execution engine 120 may perform other operations including rule-based operations, such as joins and projections, as well as filtering, group by, multi-dimensional analysis, and/or the like to reduce the processing burden on the database layer. In this way, the query execution engine 120 may execute these and other complex operations, while the one or more databases 190 can perform simpler operations to reduce the processing burden at the one or more databases 190.

In some example embodiments, the query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

In some example embodiments, the database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the data execution engine 150 may divide the database table 195 into multiple partitions by applying one or more of a hash partitioning, round-robin partitioning, and range partitioning. Moreover, the processing and storage of the individual partitions of the database table 195 may be distributed across, for example, the first database 190A, the second database 190B, the third database 190C, and/or the like. Doing so may increase the throughput and storage capacity of the database 190 including, for example, by maximizing opportunities for parallelization in which a single query accessing the database table 195 is divided into multiple operations, with operations accessing different partitions of the database table 195 being scheduled for parallel execution. For example, one or more operators may be instantiated to perform the individual operations included in the execution plan for the query. Furthermore, a single operator assigned to perform an operation may use one or more threads to perform that operation such that the query accessing the database table 195 may be executed in parallel by multiple threads.

Figure 3:
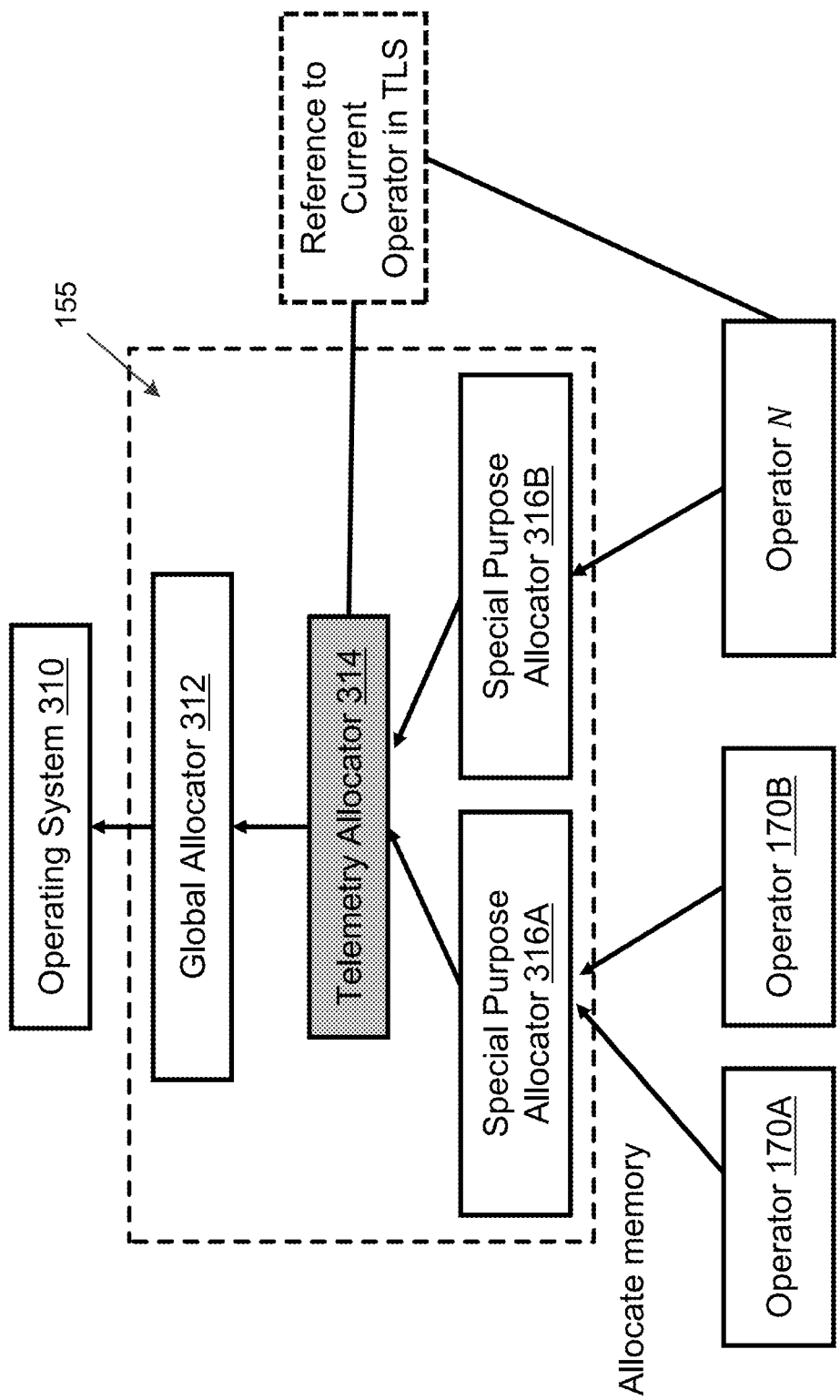
FIG. 3 depicts a schematic diagram illustrating an example of a memory management hierarchy, in accordance with some example embodiments.

In some example embodiments, the data execution engine 150 may include a memory allocator 155 configured to perform memory allocation. FIG. 3 depicts a schematic diagram illustrating an example of a memory management hierarchy, in accordance with some example embodiments. For example, as shown in FIG. 3, the memory allocator 155 may include a global allocator 312 configured to allocate memory for individual queries as a whole by sending one or more corresponding requests to the operating system 310. In some cases, FIG. 3 shows that the memory allocator 155 may also include one or more special purpose allocators 316, such as a first special purpose allocator 316A and a second special purpose allocator 316B, each of which being configured to further distribute the memory allocation associated with a query amongst the individual operators associated with the query. For instance, where the global allocator 312 procures a first memory allocation for a corresponding query, the first special purpose allocator 316A may distribute that first memory allocation as a second memory allocation to the first operator 710A and a third memory allocation to the second operator 710B. Nevertheless, neither the global allocator 312 nor the special purpose allocators 316 are capable of tracking operator- or thread-specific memory usage metrics at least because requests for memory allocation are made through a memory allocation application programming interface (API) that passes along the quantity of memory requested without identifying the requesting operator.

As such, in some example embodiments, the memory allocator 155 may further include a telemetry allocator 314 with access to the local data structure of each thread (e.g., thread-local storage (TLS)) associated with a query. The telemetry allocator 314 may have access to the local data structure (e.g., the thread-local storage (TLS) of a thread at least because programming code implementing the telemetry allocator 314 may be executed as part of the programming code being executed by the thread. The local data structure of that thread may include a reference to the operator associated with the thread. Accordingly, when an active thread of the first operator 710A requests a memory allocation, for example, the telemetry allocator 314 may access the local data structure (e.g., thread-local storage (TLS)) of that thread to identify the first operator 710A and call stack associated with the memory allocation. Doing so may enable the telemetry allocator 314 to attribute each memory allocation to the corresponding call stack and operator, thereby generating granular memory usage metrics for the individual operators and call stacks associated with the query. For instance, the telemetry allocator 314 may track, for each operator and/or call stack associated with the query, one or more memory usage metrics such as memory usage over time (e.g., the integral of memory usage known as "megabyte-seconds"), peak memory usage, minimum size of memory allocation, maximum size of memory allocation, average size of memory allocation, total quantity of memory allocations, and/or the like.

As noted, in some example embodiments, the local data structure (e.g., thread-local storage (TLS) and/or the like) of each thread being used to perform the operations within the execution plan of a query may be accessible to the telemetry allocator 314. In addition to an ability to track granular operator- and thread-specific memory usage metrics, this access to thread-local data structures may enable the telemetry allocator 314 to operate lock-free. Accordingly, the telemetry allocator 314 may track, for each combination of operator and call stack, one or more corresponding memory usage metrics.

To track memory usage over time (e.g., memory integral or "megabyte-seconds"), for example, the telemetry allocator 314 may maintain, for each combination of operator and call stack, a first value corresponding to a running aggregate of memory usage (e.g., a running memory integral), a second value corresponding to a size of the current memory allocation, and a third value corresponding to a timestamp of the last update to the running aggregate of memory usage. In response to the active thread of an operator requesting a memory allocation or a memory deallocation, the telemetry allocator 314 may update the first value, the second value, and/or the third value. For instance, the size of the current memory allocation may be multiplied by a difference between the current timestamp and the timestamp of the last update before being added to the running aggregate of memory usage. Moreover, the telemetry allocator 214 may update the size of the current memory allocation and the timestamp of the last update to the running aggregate of memory usage. Accordingly, the telemetry allocator 314 may determine, for each individual call stack or operator, one or more memory usage metrics such as memory usage over time. For the memory metrics of a particular operator, such as the first operator 170A, may be determined by combining the memory metrics of the call stacks associated with that operator.

Figure 4:
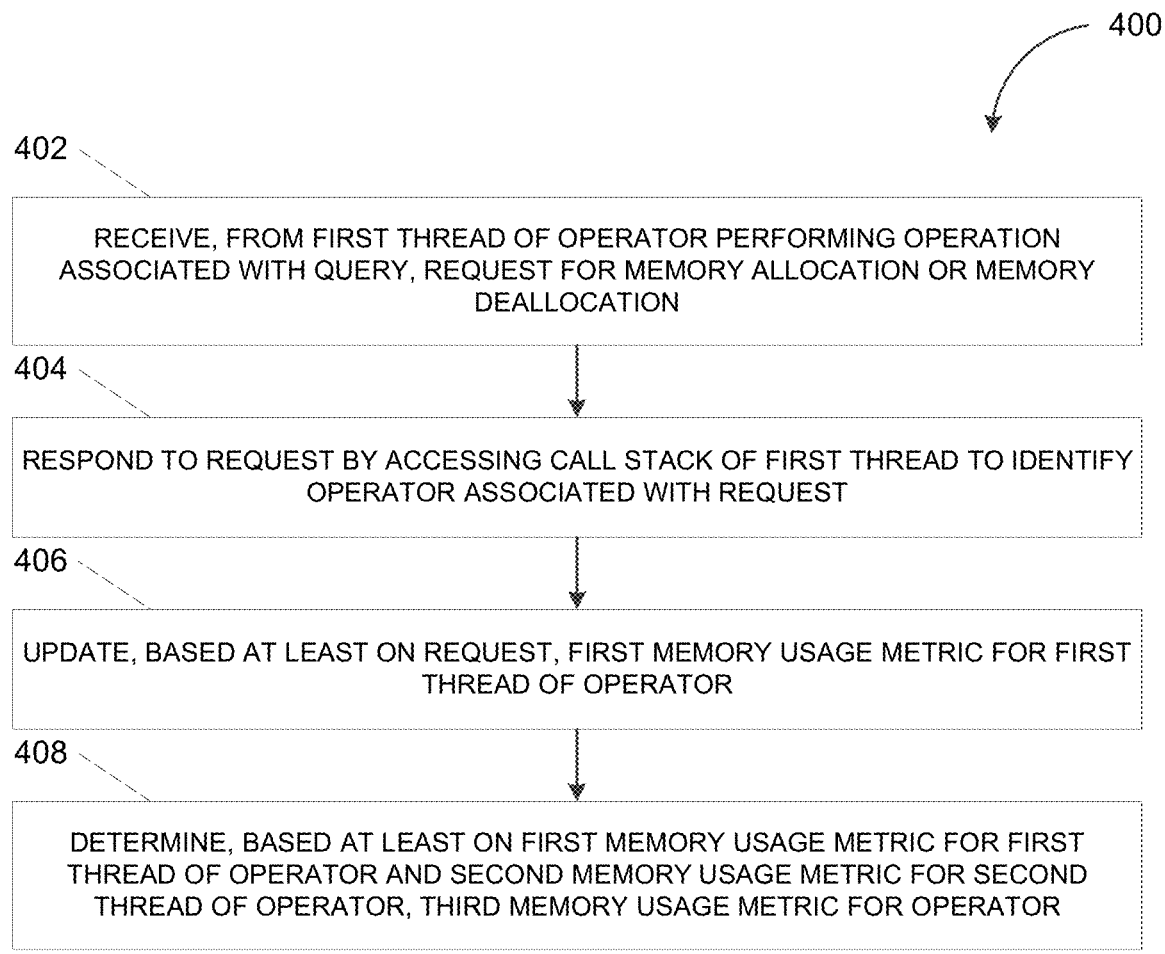
FIG. 4 depicts a flowchart illustrating an example of a process for memory usage telemetry, in accordance with some example embodiments.

FIG. 4 depicts a flowchart illustrating an example of a process 400 for on-demand access to individual partitions of a database table, in accordance with some example embodiments. Referring to FIGS. 1-4, the process 400 may be performed by the telemetry allocator 314 in order to track operator- and thread-specific memory usage metrics for a query accessing, for example, the database table 195 stored in the one or more databases 190.

At 402, the telemetry allocator 314 may receive, from a first thread of an operator performing an operation associated with a query, a request for memory allocation or memory deallocation. In some example embodiments, a query received at the data execution engine 150 may be associated with multiple operations, each of which being assigned to an operator. Meanwhile, an operator assigned to perform an operation from the query may use one or more threads to perform that operation. Accordingly, a single query may be executed in parallel by multiple operators using multiple threads. An active thread of an operator, in order to perform a corresponding operation, may make one or more requests for memory allocation and/or memory deallocation. For example, as shown in FIG. 3, the global allocator 312 associated with the query may allocate memory for the query as a whole by sending one or more corresponding requests to the operation system 310. Meanwhile, each operator associated with the query may ask for memory allocation and/or memory deallocations by sending one or more requests to the corresponding special purpose allocator 316. Because these requests for memory allocation and/or memory deallocation are sent via a memory allocation application programming interface (API) that passes along the quantity of memory requested without identifying the requesting operator, neither the global allocator 312 nor the special purpose allocators 316 are able to track operator- or thread-specific memory usage metrics arising from these requests.

At 404, the telemetry allocator 314 may respond to the request by accessing a call stack of the first thread to identify the operator associated with the request. In some example embodiments, the telemetry allocator 314 may have access to the local data structures (e.g., thread-local storage (TLS)) of each thread associated with the query at least because programming code implementing the telemetry allocator 314 may be executed as part of the programming code being executed by each thread. The local data structure of a thread may include a reference to the operator associated with the thread. Accordingly, when a thread requests for a memory allocation (or memory deallocation), the telemetry allocator 314 may access the local data structure (e.g., the thread-local storage (TLS)) of that thread to identify the corresponding operator.

At 406, the telemetry allocator 314 may update, based at least on the request, a first memory usage metric for the first thread of the operator. In some example embodiments, the telemetry allocator 314 may track, for each combination of operator and call stack, one or more corresponding memory usage metrics. For example, to track memory usage over time (e.g., memory integral or "megabyte-seconds"), the telemetry allocator 314 may maintain, for each combination of operator and call stack, a first value corresponding to a running aggregate of memory usage (e.g., a running memory integral), a second value corresponding to a size of the current memory allocation, and a third value corresponding to a timestamp of the last update to the running aggregate of memory usage. In response to a thread of an operator requesting a memory allocation or a memory deallocation, the telemetry allocator 314 may update the first value, the second value, and/or the third value. For instance, the size of the current memory allocation may be multiplied by a difference between the current timestamp and the timestamp of the last update before being added to the running aggregate of memory usage. Moreover, the telemetry allocator 214 may update the size of the current memory allocation and the timestamp of the last update to the running aggregate of memory usage.

At 408, the telemetry allocator 314 may determine, based at least on the first memory usage metric for the first thread of the operator and a second memory usage metric for a second thread of the operator, a third memory usage metric for the operator. In some example embodiments, the telemetry allocator 314 may track the memory usage metrics associated with an operator by tracking the memory usage metrics of the individual threads (e.g., call stacks) associated with the operator. Accordingly, where a single operator uses a first thread and a second thread to perform an operation, the memory usage metrics of the operator may correspond to the memory usage metrics of the first call stack of the first thread and the memory usage metrics of the second call stack of the second thread. In the case of memory usage over time (e.g., memory integral or "megabyte-seconds") for a single operator performing an operation, for example, the telemetry allocator 314 may total the respective memory usage over time of the call stacks of the individual threads used to perform the operation.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: receiving, from a first thread of a first operator performing a first operation associated with a query, a first request for memory allocation or memory deallocation; responding to the first request by at least accessing a first local data structure of the first thread to identify the first operator associated with the first request; updating, based at least on the first request, a first memory usage metric for the first thread of the first operator; and determining, based at least on the first memory usage metric for the first thread of the first operator and a second memory usage metric for a second thread of the first operator, a third memory usage metric for the first operator.

Example 2: The system of Example 1, wherein the operations further comprise: receiving, from the second thread of the first operator, a second request for memory allocation or memory deallocation; responding to the second request by at least accessing a second local data structure of the second thread to identify the first operator associated with the second request; and updating, based at least on the second request, the second memory usage metric for the second thread of the first operator.

Example 3: The system of any one of Examples 1 to 2, wherein the operations further comprise: receiving, from a third thread of a second operator performing a second operation associated with the query, a second request for memory allocation or memory deallocation; responding to the second request by at least accessing a second local data structure of the third thread to identify the second operator associated with the second request; updating, based at least on the second request, a fourth memory usage metric for the third thread of the second operator; and determining, based at least on the fourth memory usage metric for the third thread of the second operator, a fifth memory usage metric for the second operator.

Example 4: The system of any one of Examples 1 to 3, wherein the first local data structure of the first thread includes a reference identifying the first operator to identify the first operator as being associated with the first request.

Example 5: The system of any one of Examples 1 to 4, wherein the first memory usage metric includes a memory integral corresponding to a memory usage over time.

Example 6: The system of Example 5, wherein the updating of the first memory usage metric includes updating a first value corresponding to a running aggregate of the memory integral, a second value corresponding to a size of a current memory allocation, and a third value corresponding to a timestamp of a last update to the running aggregate of the memory integral.

Example 7: The system of Example 6, wherein the updating of the first memory usage metric includes adding, to the running aggregate of the memory integral, a result of multiplying the size of the current memory allocation by a difference between a current timestamp and the timestamp of the last update.

Example 8: The system of any one of Examples 1 to 7, wherein the first memory usage metric includes one or more of peak memory usage, minimum size of memory allocation, maximum size of memory allocation, average size of memory allocation, and total quantity of memory allocations.

Example 9: The system of any one of Examples 1 to 8, wherein the first local data structure comprises a thread-local storage (TLS) of the first thread.

Example 10: The system of any one of Examples 1 to 9, wherein the operations further comprise: responding to the first request by allocating or deallocating at least a portion of a memory allocated to the query.

Example 11: The system of any one of Examples 1 to 10, wherein the first thread and/or the second thread are executed in parallel with a third thread used by a second operator to perform a second operation associated with the query.

Example 12: A method, comprising: receiving, from a first thread of a first operator performing a first operation associated with a query, a first request for memory allocation or memory deallocation; responding to the first request by at least accessing a first local data structure of the first thread to identify the first operator associated with the first request; updating, based at least on the first request, a first memory usage metric for the first thread of the first operator; and determining, based at least on the first memory usage metric for the first thread of the first operator and a second memory usage metric for a second thread of the first operator, a third memory usage metric for the first operator.

Example 13: The method of Example 12, further comprising: receiving, from the second thread of the first operator, a second request for memory allocation or memory deallocation; responding to the second request by at least accessing a second local data structure of the second thread to identify the first operator associated with the second request; and updating, based at least on the second request, the second memory usage metric for the second thread of the first operator.

Example 14: The method of any one of Examples 12 to 13, further comprising: receiving, from a third thread of a second operator performing a second operation associated with the query, a second request for memory allocation or memory deallocation; responding to the second request by at least accessing a second local data structure of the third thread to identify the second operator associated with the second request; updating, based at least on the second request, a fourth memory usage metric for the third thread of the second operator; and determining, based at least on the fourth memory usage metric for the third thread of the second operator, a fifth memory usage metric for the second operator.

Example 15: The method of any one of Examples 12 to 14, wherein the first local data structure of the first thread includes a reference identifying the first operator to identify the first operator as being associated with the first request.

Example 16: The method of any one of Examples 12 to 15, wherein the first memory usage metric includes a memory integral corresponding to a memory usage over time, and wherein the updating of the first memory usage metric includes adding, to a running aggregate of the memory integral, a result of multiplying a size of the current memory allocation by a difference between a current timestamp and a timestamp of a last update to the running aggregate of the memory integral.

Example 17: The method of any one of Examples 12 to 16, wherein the first memory usage metric includes one or more of peak memory usage, minimum size of memory allocation, maximum size of memory allocation, average size of memory allocation, and total quantity of memory allocations.

Example 18: The method of any one of Examples 12 to 17, wherein the first local data structure comprises a thread-local storage (TLS) of the first thread.

Example 19: The method of any one of Examples 12 to 18, further comprising: responding to the first request by allocating or deallocating at least a portion of a memory allocated to the query.

Example 20: A non-transitory computer readable medium storing instructions, which when executed by at least one data processor, result in operations comprising: receiving, from a first thread of a first operator performing a first operation associated with a query, a first request for memory allocation or memory deallocation; responding to the first request by at least accessing a first local data structure of the first thread to identify the first operator associated with the first request; updating, based at least on the first request, a first memory usage metric for the first thread of the first operator; and determining, based at least on the first memory usage metric for the first thread of the first operator and a second memory usage metric for a second thread of the first operator, a third memory usage metric for the first operator.

Figure 5:
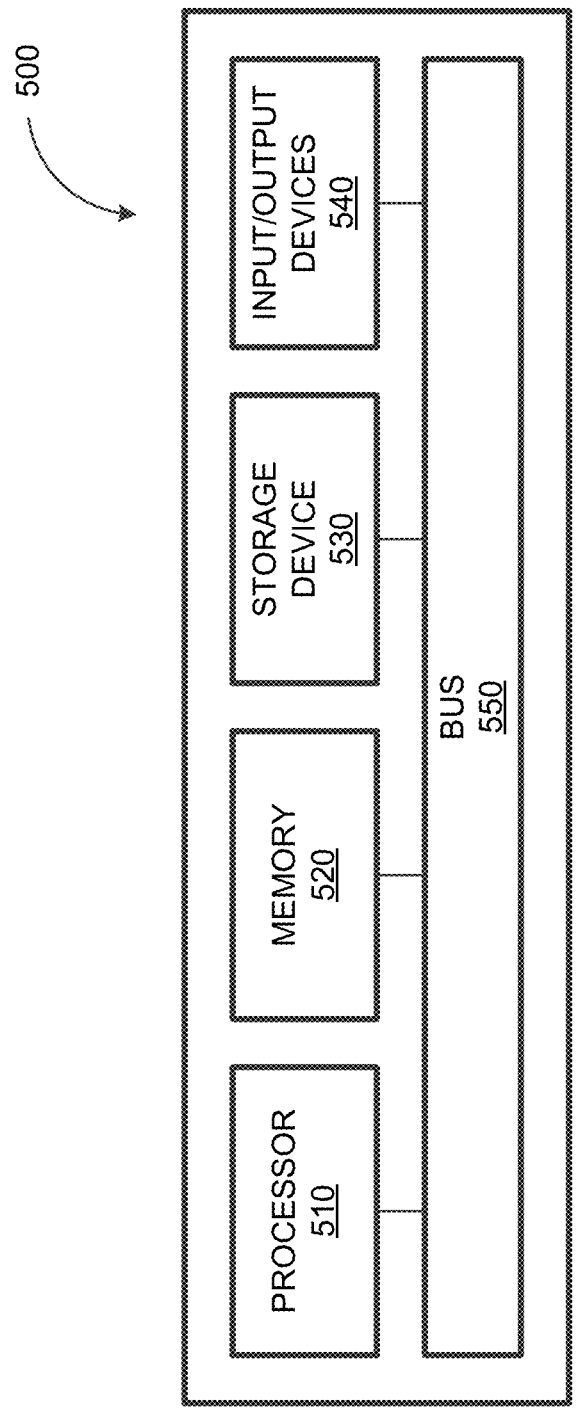
FIG. 5 depicts a block diagram illustrating an example of a computing system, in accordance with some example embodiments.

FIG. 5 depicts a block diagram illustrating an example of a computing system 500 consistent with implementations of the current subject matter. Referring to FIGS. 1-5, the computing system 500 may implement the data execution engine 150 and/or any components therein.

As shown in FIG. 4, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the data execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one processor; and
   at least one memory storing instructions which, when executed by the at least one processor, cause operations comprising:
      receiving, from a first thread of a first operator performing a first operation associated with a query, a first request for memory allocation or memory deallocation;
      responding to the first request by at least accessing a first local data structure of the first thread to identify the first operator associated with the first request;
      updating, based at least on the first request, a first memory usage metric for the first thread of the first operator, wherein the updating of the first memory usage metric includes adding, to a running aggregate of a memory integral, a result of multiplying a size of a current memory allocation by a difference between a current timestamp and a timestamp of a last update;
      determining, based at least on the first memory usage metric for the first thread of the first operator and a second memory usage metric for a second thread of the first operator, a third memory usage metric for the first operator; and
      responding to the first request by allocating or deallocating at least a portion of a memory allocated to the query.

2. The system of claim 1, wherein the operations further comprise:
   receiving, from the second thread of the first operator, a second request for memory allocation or memory deallocation;
   responding to the second request by at least accessing a second local data structure of the second thread to identify the first operator associated with the second request; and
   updating, based at least on the second request, the second memory usage metric for the second thread of the first operator.

3. The system of claim 1, wherein the operations further comprise:
   receiving, from a third thread of a second operator performing a second operation associated with the query, a second request for memory allocation or memory deallocation;
   responding to the second request by at least accessing a second local data structure of the third thread to identify the second operator associated with the second request;
   updating, based at least on the second request, a fourth memory usage metric for the third thread of the second operator; and
   determining, based at least on the fourth memory usage metric for the third thread of the second operator, a fifth memory usage metric for the second operator.

4. The system of claim 1, wherein the first local data structure of the first thread includes a reference identifying the first operator to identify the first operator as being associated with the first request.

5. The system of claim 1, wherein the first memory usage metric includes the memory integral corresponding to a memory usage over time.

6. The system of claim 5, wherein the updating of the first memory usage metric includes updating a first value corresponding to the running aggregate of the memory integral, a second value corresponding to the size of the current memory allocation, and a third value corresponding to the timestamp of the last update to the running aggregate of the memory integral.

7. The system of claim 1, wherein the first memory usage metric includes one or more of peak memory usage, minimum size of memory allocation, maximum size of memory allocation, average size of memory allocation, and total quantity of memory allocations.

8. The system of claim 1, wherein the first local data structure comprises a thread-local storage (TLS) of the first thread.

9. The system of claim 1, wherein the first thread and/or the second thread are executed in parallel with a third thread used by a second operator to perform a second operation associated with the query.

10. A computer-implemented method, comprising:
receiving, from a first thread of a first operator performing a first operation associated with a query, a first request for memory allocation or memory deallocation;
responding to the first request by at least accessing a first local data structure of the first thread to identify the first operator associated with the first request;
updating, based at least on the first request, a first memory usage metric for the first thread of the first operator, wherein the updating of the first memory usage metric includes adding, to a running aggregate of a memory integral, a result of multiplying a size of a current memory allocation by a difference between a current timestamp and a timestamp of a last update;
determining, based at least on the first memory usage metric for the first thread of the first operator and a second memory usage metric for a second thread of the first operator, a third memory usage metric for the first operator; and
responding to the first request by allocating or deallocating at least a portion of a memory allocated to the query.

11. The method of claim 10, further comprising:
receiving, from the second thread of the first operator, a second request for memory allocation or memory deallocation;
responding to the second request by at least accessing a second local data structure of the second thread to identify the first operator associated with the second request; and
updating, based at least on the second request, the second memory usage metric for the second thread of the first operator.

12. The method of claim 10, further comprising:
receiving, from a third thread of a second operator performing a second operation associated with the query, a second request for memory allocation or memory deallocation;
responding to the second request by at least accessing a second local data structure of the third thread to identify the second operator associated with the second request;
updating, based at least on the second request, a fourth memory usage metric for the third thread of the second operator; and
determining, based at least on the fourth memory usage metric for the third thread of the second operator, a fifth memory usage metric for the second operator.

13. The method of claim 10, wherein the first local data structure of the first thread includes a reference identifying the first operator to identify the first operator as being associated with the first request.

14. The method of claim 10, wherein the first memory usage metric includes one or more of peak memory usage, minimum size of memory allocation, maximum size of memory allocation, average size of memory allocation, and total quantity of memory allocations.

15. The method of claim 10, wherein the first local data structure comprises a thread-local storage (TLS) of the first thread.

16. A non-transitory computer readable medium storing instructions, which when executed by at least one processor, result in operations comprising:
receiving, from a first thread of a first operator performing a first operation associated with a query, a first request for memory allocation or memory deallocation;
responding to the first request by at least accessing a first local data structure of the first thread to identify the first operator associated with the first request;
updating, based at least on the first request, a first memory usage metric for the first thread of the first operator, wherein the updating of the first memory usage metric includes adding, to a running aggregate of a memory integral, a result of multiplying a size of a current memory allocation by a difference between a current timestamp and a timestamp of a last update;
determining, based at least on the first memory usage metric for the first thread of the first operator and a second memory usage metric for a second thread of the first operator, a third memory usage metric for the first operator; and
responding to the first request by allocating or deallocating at least a portion of a memory allocated to the query.

* * * * *